(12) United States Patent
Furukawa

(10) Patent No.: US 9,071,045 B2
(45) Date of Patent: Jun. 30, 2015

(54) TERMINAL PROCESSING STRUCTURE AND TERMINAL PROCESSING METHOD OF COAXIAL CABLE

(71) Applicant: Yazaki Corporation, Tokyo (JP)

(72) Inventor: Shouichi Furukawa, Makinohara (JP)

(73) Assignee: Yazaki Corporation, Tokyo (JP)

( * ) Notice: Subject to any disclaimer, the term of this patent is extended or adjusted under 35 U.S.C. 154(b) by 85 days.

(21) Appl. No.: 13/963,088

(22) Filed: Aug. 9, 2013

(65) Prior Publication Data

US 2013/0319761 A1 Dec. 5, 2013

Related U.S. Application Data

(63) Continuation of application No. PCT/JP2012/055148, filed on Feb. 23, 2012.

(30) Foreign Application Priority Data

Mar. 2, 2011 (JP) .................................. 2011-045405

(51) Int. Cl.
*H01R 43/048* (2006.01)
*H02G 15/02* (2006.01)
(Continued)

(52) U.S. Cl.
CPC ......... *H02G 15/025* (2013.01); *Y10T 29/49123* (2015.01); *H01R 4/185* (2013.01); *H01R 9/0518* (2013.01); *H01R 43/048* (2013.01)

(58) Field of Classification Search
CPC .. H02G 15/025; H01R 43/048; H01R 9/0518; Y10T 29/49123

USPC .................. 174/74 R, 75 R, 75 C, 84 R, 84 C
See application file for complete search history.

(56) References Cited

U.S. PATENT DOCUMENTS

| 5,716,236 | A | 2/1998 | O'Sullivan et al. |
| 6,332,807 | B1 * | 12/2001 | Asakura et al. ............... 439/578 |
| 2001/0004569 | A1 | 6/2001 | Ozaki |

(Continued)

FOREIGN PATENT DOCUMENTS

| CN | 101540461 A | 9/2009 |
| EP | 0694989 A2 | 1/1996 |

(Continued)

OTHER PUBLICATIONS

International Search Report (PCT/ISA/210) dated Jun. 12, 2012 in International Application No. PCT/JP2012/055148.

(Continued)

*Primary Examiner* — Hoa C Nguyen
*Assistant Examiner* — Amol Patel
(74) *Attorney, Agent, or Firm* — Sughrue Mion, PLLC

(57) ABSTRACT

A terminal processing structure of a coaxial cable includes a core wire, an insulator with which an outer periphery of the core wire is covered, a braid with which an outer periphery of the insulator is covered, and an outer sheath with which an outer periphery of the braid is covered. The outer sheath is divided into a distal piece and a proximal piece by being notched along a circumferential direction in a cable distal end and the distal piece is held in a position separate from the proximal piece and thereby an exposed part of the braid to which a braid crimp part of a shield terminal is crimped is formed between the distal piece and the proximal piece and also a distal end of the braid is covered with the distal piece.

2 Claims, 6 Drawing Sheets

(51) Int. Cl.
*H01R 4/18* (2006.01)
*H01R 9/05* (2006.01)

(56) References Cited

U.S. PATENT DOCUMENTS

| | | |
|---|---|---|
| 2001/0041472 A1 | 11/2001 | Ozaki |
| 2009/0011663 A1* | 1/2009 | Morikawa et al. ............ 439/877 |
| 2009/0233483 A1 | 9/2009 | Huixiong et al. |
| 2011/0065316 A1 | 3/2011 | Morikawa |

FOREIGN PATENT DOCUMENTS

| | | |
|---|---|---|
| EP | 2104184 A2 | 9/2009 |
| JP | 9245899 A | 9/1997 |
| JP | 11176527 A | 7/1999 |
| JP | 2001176566 A | 6/2001 |
| JP | 2003257560 A | 9/2003 |
| JP | 2008218225 A | 9/2008 |
| JP | 200954461 A | 3/2009 |
| JP | 2009211851 A | 9/2009 |
| JP | 201049859 A | 3/2010 |

OTHER PUBLICATIONS

Written Opinion (PCT/ISA/237) dated Jun. 12, 2012 in International Application No. PCT/JP2012/055148.
Communication issued on Feb. 12, 2015 by The State Intellectual Property Office of the PR of China in related application No. 201280011328.2.
Office Action dated Dec. 2, 2014, issued by the Japanese Intellectual Property Office in counterpart Japanese Application No. 2011-045405.

* cited by examiner

TERMINAL PROCESSING STRUCTURE AND TERMINAL PROCESSING METHOD OF COAXIAL CABLE

CROSS REFERENCE TO RELATED APPLICATION

This application is a continuation of PCT application No. PCT/JP2012/055148, which was filed on Feb. 23, 2012 based on Japanese Patent Applications No. 2011-045405 filed on Mar. 2, 2011, the contents of which are incorporated herein by reference.

BACKGROUND OF THE INVENTION

1. Technical Field

The present invention relates to a terminal processing structure and a terminal processing method of a coaxial cable.

2. Background Art

A coaxial cable such as an antenna wire used in high-frequency signal transmission generally includes a core wire as a central conductor, an insulator as a dielectric with which an outer periphery of the core wire is covered, a braid as an external conductor with which an outer periphery of the dielectric is covered, and an outer sheath (also called an insulating sheath) with which an outer periphery of the braid is covered sequentially from the center toward the outside. The coaxial cable of such a configuration is provided with a coaxial connector in a distal end of the coaxial cable in order to make connection to, for example, a coaxial cable or a device of the other side. The coaxial connector has a shield terminal for coaxial cable constructed so as to earth and connect the braid to a coaxial connector of the other side and block electrical noise of electromagnetic waves, static electricity, etc.

FIG. 4 shows an example of a terminal processing structure of a coaxial cable described in Patent Literature 1.

A coaxial cable 20 includes a core wire 21, an insulator 22 with which an outer periphery of the core wire 21 is covered, a braid 23 with which an outer periphery of the insulator 22 is covered, and an outer sheath 24 with which an outer periphery of the braid 23 is covered, and a core wire exposed part in which the outer sheath 24, the braid 23 and the insulator 22 are removed to expose the core wire 21, an insulator exposed part in which the outer sheath 24 and the braid 23 are removed to expose the insulator 22, and a braid exposed part in which the outer sheath 24 is removed to expose the braid 23 are formed in a cable distal end sequentially from the distal end side.

Then, a central conductor 61 of a coaxial connector 60 is crimped to the exposed part of the core wire 21, and a braid crimp part 66 of a shield terminal 63 of the coaxial connector 60 is crimped to the exposed part of the braid 23, and an outer sheath crimp part 67 of the shield terminal 63 is crimped to the outer sheath 24. In addition, an insulator 62 is disposed between the central conductor 61 and the shield terminal 63 of the coaxial connector 60. In this case, the braid 23 is exposed from the distal end edge of the outer sheath 24, and the distal end of the braid 23 stays in a position of the front from the distal end of the insulator 22 with the braid 23 cut.

Terminal processing of this coaxial cable 20 is performed as follows. FIGS. 5A to 5C show a procedure of its processing.

First, as shown in FIG. 5A, the coaxial cable 20 whose whole is covered with the outer sheath 24 is prepared and a distal end of the coaxial cable 20 is peeled. That is, as shown in FIG. 5B, by removing the outer sheath 24, the braid 23 and the insulator 22 by predetermined dimensions, the core wire 21, the insulator 22 and the braid 23 are exposed sequentially from the distal end side of the cable. Then, as shown in FIG. 4 and FIG. 5C, a terminal processing structure is completed by crimping the braid crimp part 66 of the shield terminal 63 to the exposed part of the braid 23 and crimping the outer sheath crimp part 67 of the shield terminal 63 to the outer sheath 24.

Also, as another example of the terminal processing structure of the coaxial cable, a terminal processing structure described in Patent Literature 2 is known. The contents of the terminal processing structure will be described using FIGS. 6A to 6C.

In this terminal processing structure, a coaxial cable 100 is connected to a coaxial connector 200 in the following manner.

That is, in this terminal processing structure, an intermediate portion of an outer sheath 101 in a distal end of the coaxial cable 100 is peeled circumferentially and an outer sheath 101A of a distal end side is pulled to an outer sheath 101B of a proximal end side and by annularly projecting a braid 102 from the portion between ends of the outer sheaths 101A, 101B of the distal end side and the proximal end side to the outside beyond an outside diameter of the outer sheaths 101A, 101B with this pull, as shown in FIG. 6A, an annular projection braid part 102A is formed and thereafter, as shown in FIG. 6B, a folded braid part 102B is formed by folding the annular projection braid part 102A in the outer sheath 101A of the distal end side so as to laminate the annular projection braid part 102A, and as shown in FIG. 6C, a braid crimp part 202 of a shield terminal 201 of the coaxial connector 200 is crimped and connected to this folded braid part 102B and also, an outer sheath crimp part 203 of the shield terminal 201 is crimped and fixed to the other outer sheath 101B in the vicinity of a terminal hook part 102C formed in a proximal end of the folded braid part 102B. In addition, in FIGS. 6A to 6C, numeral 103 is a core wire and numeral 104 is an insulator and numeral 204 is a press part and numeral 210 is a dielectric.

CITATION LIST

Patent Literature

Patent Literature 1: JP-A-2010-49859
Patent Literature 2: JP-A-2009-54461

SUMMARY OF THE INVENTION

Incidentally, in the art described in Patent Literature 1 shown in FIGS. 4 to 5C, in the case of applying a tensile force to the cable in a state of crimping the braid crimp part 66 of the shield terminal 63 to the exposed part of the braid 23 when the distal end (cut end) of the braid 23 remains exposed from the distal end of the outer sheath 24, the braid 23 may fray out of the distal end (portion shown by H in the drawing) and there was a problem of decreasing a force of fastening between the coaxial cable 20 and the shield terminal 63 due to fraying of the braid 23.

Also, in the art described in Patent Literature 2 shown in FIGS. 6A to 6C, when the cut end (distal end) of the braid 102 is covered with the outer sheath 101A of the distal end side, the cut end of the braid 102 can be prevented from fraying, but the annular projection braid part 102A is overlaid on the outer sheath 101A of the distal end side and the braid crimp part 202 of the shield terminal 201 is crimped to the overlaid portion, so that there is a problem of increasing a cross-sectional size of the crimp portion to increase occupied space. Also, since the annular projection braid part 102A or the folded braid part 102B is formed, there are problems that a configuration of the cable distal end becomes complicated and also much time and effort of terminal processing work are required. Further, since the shield terminal 201 is crimped to the portion (the folded braid part 102B) in which the braid 102 is overlaid on the outer sheath 101, there is a problem that the braid 101 tends to slip at the crimp part to decrease the fastening strength due to crimping to the portion in which many layers of members overlap.

The invention has been implemented in view of the circumstances described above, and an object of the invention is to provide a terminal processing structure and a terminal processing method of a coaxial cable capable of exerting a stable fastening force in the case of connecting a terminal in a simple configuration while preventing a braid from fraying.

In order to achieve the object described above, a terminal processing structure of a coaxial cable according to the invention is characterized by the following (1) and (2).

(1) The terminal processing structure of the coaxial cable includes a core wire, an insulator with which an outer periphery of the core wire is covered, a braid with which an outer periphery of the insulator is covered, and an outer sheath with which an outer periphery of the braid is covered, and the outer sheath is divided into a distal piece and a proximal piece by being notched along a circumferential direction in a cable distal end and the distal piece is held in a position separate from the proximal piece and thereby an exposed part of the braid to which a braid crimp part of a shield terminal is crimped is formed between the distal piece and the proximal piece and also a distal end of the braid is covered with the distal piece.

(2) In the terminal processing structure of the coaxial cable with the configuration of the above (1), a braid crimp part of the shield terminal is crimped to an exposed part of the braid formed between the distal piece and the proximal piece and also, outer sheath crimp parts formed in both sides of the braid crimp part of the shield terminal are respectively crimped to the distal piece and the proximal piece.

Also, in order to achieve the object described above, a terminal processing method of a coaxial cable according to the invention is characterized by the following (3).

(3) The terminal processing method of the coaxial cable has the steps of:

forming a core wire exposed part in which an outer sheath, a braid and an insulator are removed to expose a core wire, an insulator exposed part in which the outer sheath and the braid are removed to expose the insulator, and a braid exposed part in which the outer sheath is removed to expose the braid sequentially from a distal end side in a distal end of the coaxial cable including the core wire, the insulator with which an outer periphery of the core wire is covered, a braid with which an outer periphery of the insulator is covered, and the outer sheath with which an outer periphery of the braid is covered, dividing the outer sheath into a distal piece and a proximal piece by putting a notch along a circumferential direction in a position spaced in the proximal end side from a distal end edge of the outer sheath adjacent to the braid exposed part by a predetermined dimension after the step, and ensuring an exposed part of the braid to which a braid crimp part of a shield terminal is crimped between the distal piece and the proximal piece and also covering a distal end of the braid with the distal piece by sliding the distal piece to a cable distal end side and holding the distal piece in a position separate from the proximal piece after the step.

According to the terminal processing structure of the coaxial cable with the configuration of the above (1), the distal end (cut end) of the braid is covered with a part of the outer sheath (the distal piece), so that the distal end of the braid can be prevented from fraying, and the fastening strength can be prevented from decreasing due to fraying of the braid. Also, the braid is not overlaid on the outer sheath and the braid crimp part of the shield terminal is crimped to the exposed part of the braid ensured between the distal piece and the proximal piece, so that a cross-sectional size of the crimp portion of the shield terminal can be decreased and occupied space can be decreased. Also, the braid is only exposed between the distal piece and the proximal piece, so that the configuration is simple, and time and effort of terminal processing work are not required. Further, the braid crimp part of the shield terminal can be directly crimped to the braid (the braid in a state of making close contact with an outer periphery of the insulator) in a state of being not overlaid on the outer sheath, so that the braid is resistant to slipping at the crimp part and a high strength of fastening to the shield terminal can be maintained.

According to the terminal processing structure of the coaxial cable with the configuration of the above (2), the braid crimp part of the shield terminal is crimped to the exposed part of the braid formed between the distal piece and the proximal piece and also, the outer sheath crimp parts formed in both sides of the braid crimp part of the shield terminal are respectively crimped to the distal piece and the proximal piece, so that the braid can surely be prevented from fraying and also, the strength of fastening between the coaxial cable and the shield terminal can be increased.

According to the terminal processing method of the coaxial cable with the configuration of the above (3), the terminal processing structure with the configuration of the above (1) is obtained by sliding a part of the outer sheath (the distal piece) to the distal end side, so that the distal end of the braid can be protected so as not to fray in a part of the outer sheath while preventing the braid from loosening.

According to the invention, the distal end of the braid can be prevented from fraying, and the fastening strength can be prevented from decreasing due to fraying of the braid. Also, the cross-sectional size of the crimp portion of the shield terminal can be decreased and the occupied space can be decreased. Also, the configuration can be simplified and also time and effort of terminal processing work are reduced. Further, the braid can be prevented from slipping at the crimp part of the shield terminal and a high strength of fastening to the shield terminal can be maintained.

The invention has been described above briefly. Further, the details of the invention will become more apparent by reading through a mode for carrying out the invention described below with reference to the accompanying drawings.

BRIEF DESCRIPTION OF THE DRAWINGS

FIG. 6A is a perspective view of an annular projection braid part and FIG. 6B is a perspective view of a folded braid part and FIG. 6C is a perspective view showing a state before crimping of a shield terminal.

DETAILED DESCRIPTION OF THE EXEMPLARY EMBODIMENTS

An embodiment of the invention will hereinafter be described with reference to the drawings.

Figure 1:
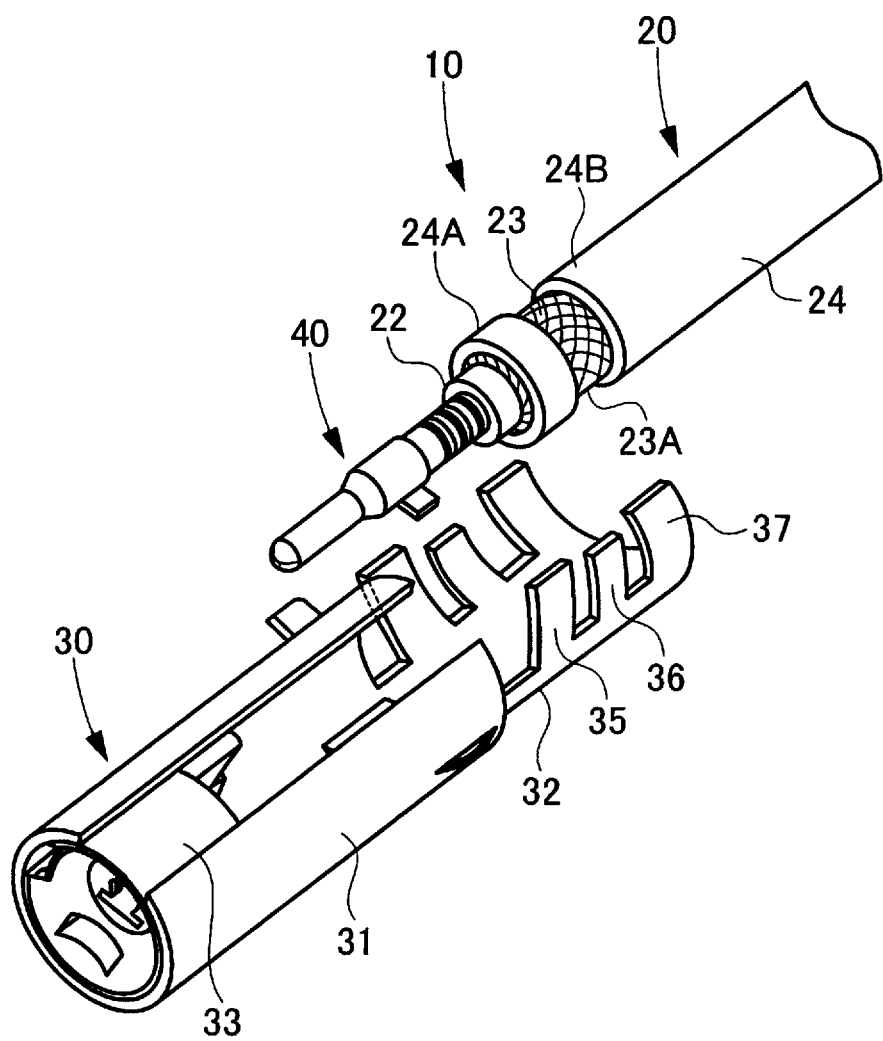
FIG. 1 is a view showing a terminal processing structure of a coaxial cable of an embodiment of the invention and is a perspective view showing a state before crimping of a shield terminal.
Figure 2:
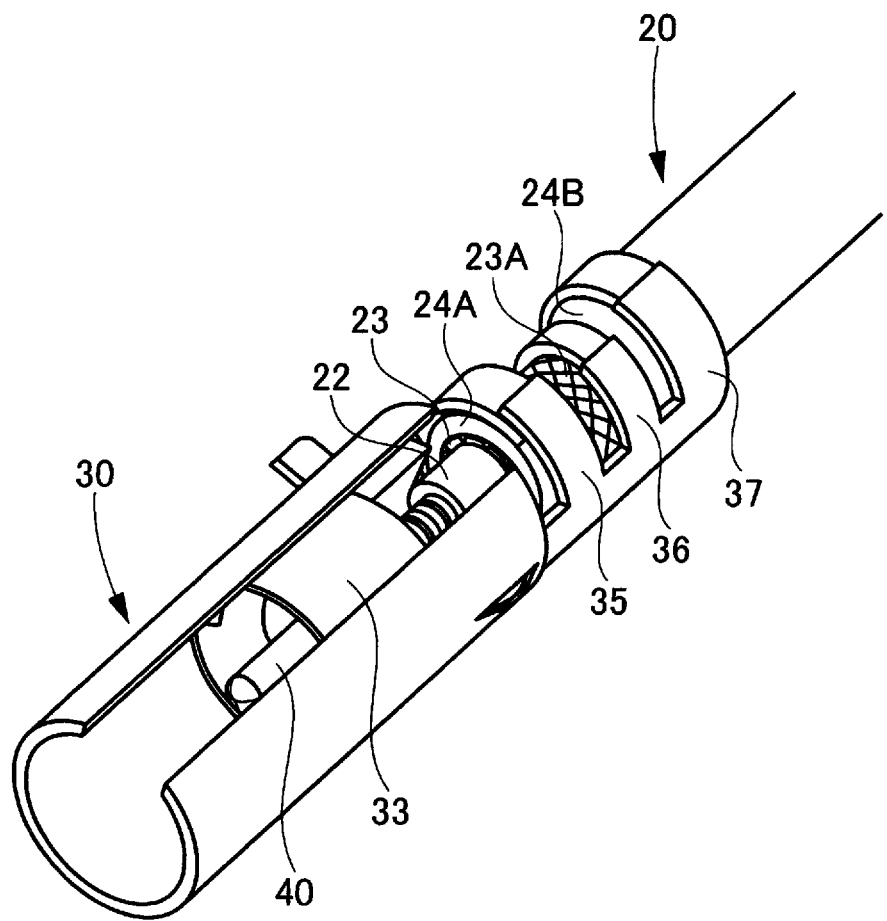
FIG. 2 is a view showing the terminal processing structure of the coaxial cable of the embodiment of the invention and is a perspective view showing a state after crimping of the shield terminal.
Figure 3A:
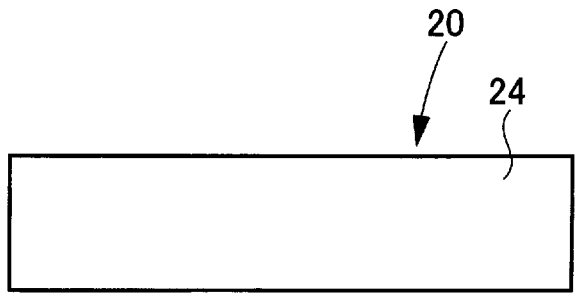
FIGS. 3A to 3D are a step explanatory diagram of a terminal processing method of the coaxial cable of the embodiment of the invention, and each of FIGS. 3A to 3D is a diagram showing one step.
Figure 3B:
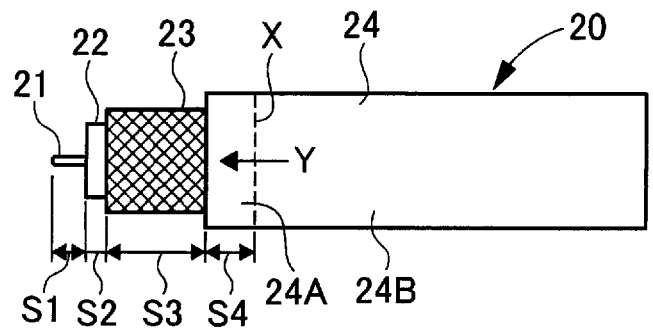
Figure 3C:
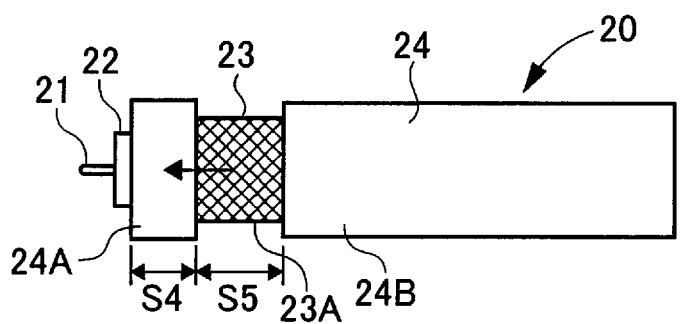
Figure 3D:
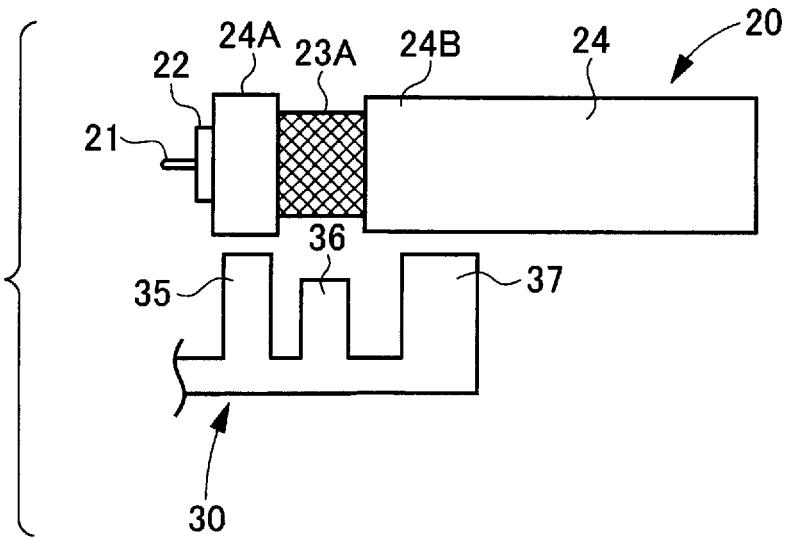
Figure 4:
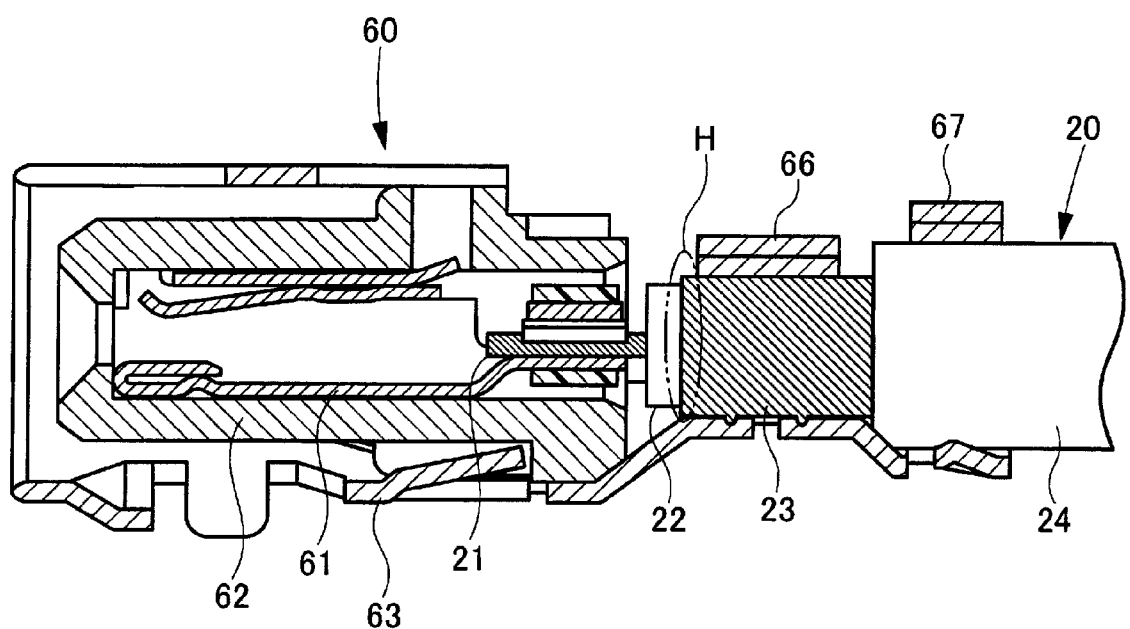
FIG. 4 is a sectional view showing one example of a terminal processing structure of a conventional coaxial cable.
Figure 5A:
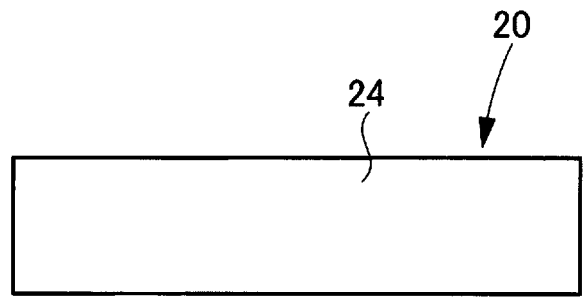
FIGS. 5A to 5C are a step explanatory diagram of a terminal processing method of the conventional coaxial cable, and each of FIGS. 5A to 5C is a diagram showing one step.
Figure 5B:
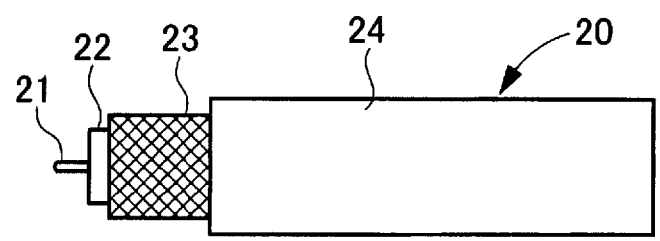
Figure 5C:
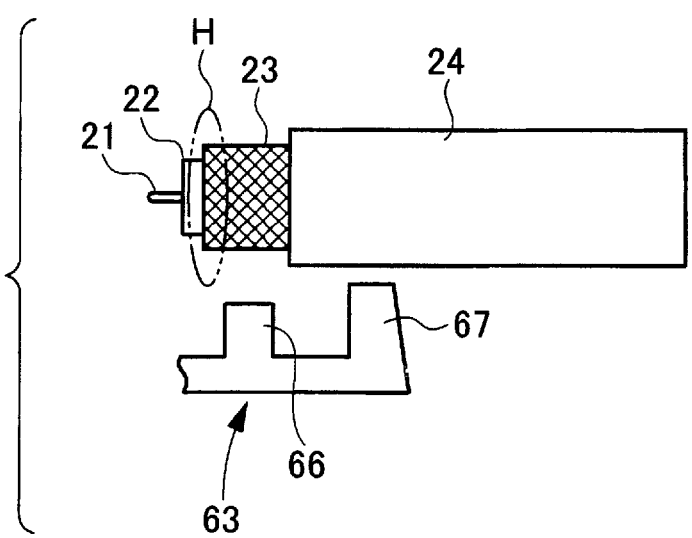
Figure 6C:
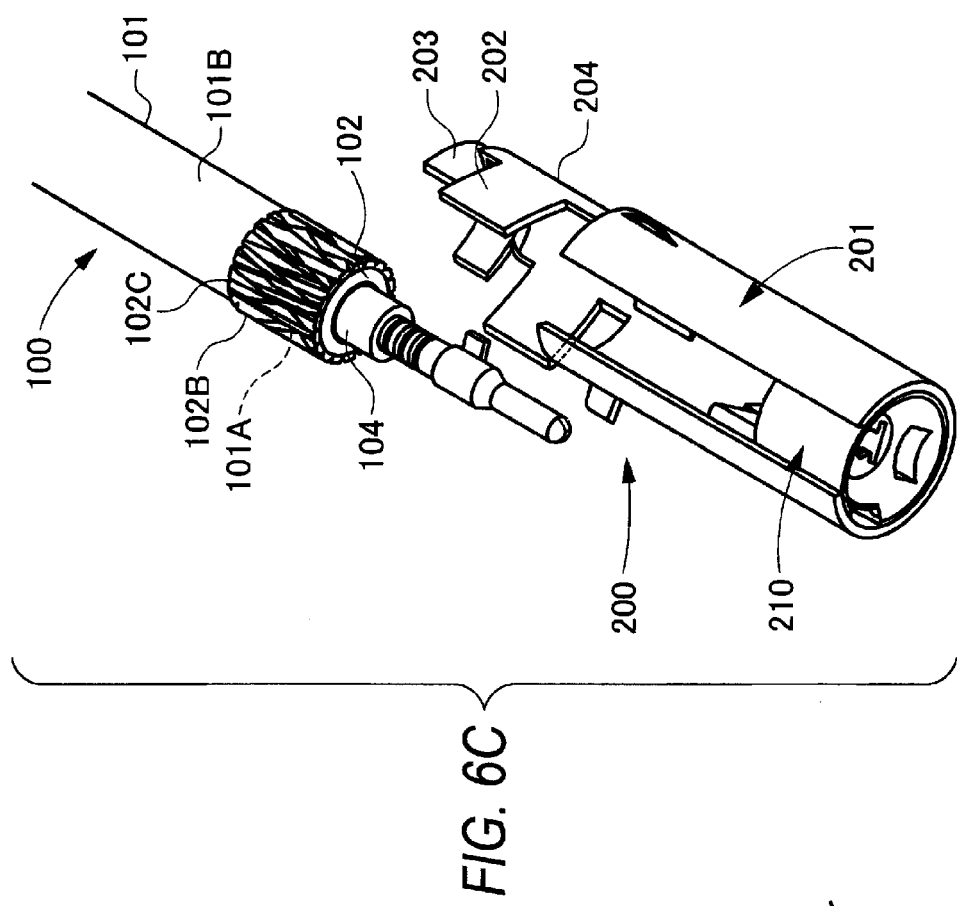
FIGS. 6A to 6C are a view showing another example of the terminal processing structure of the conventional coaxial cable.
Figure 6A:
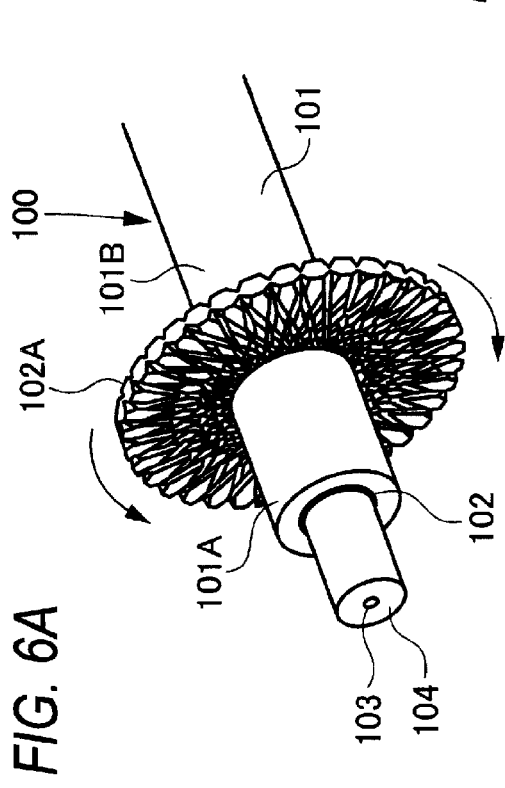
Figure 6B:
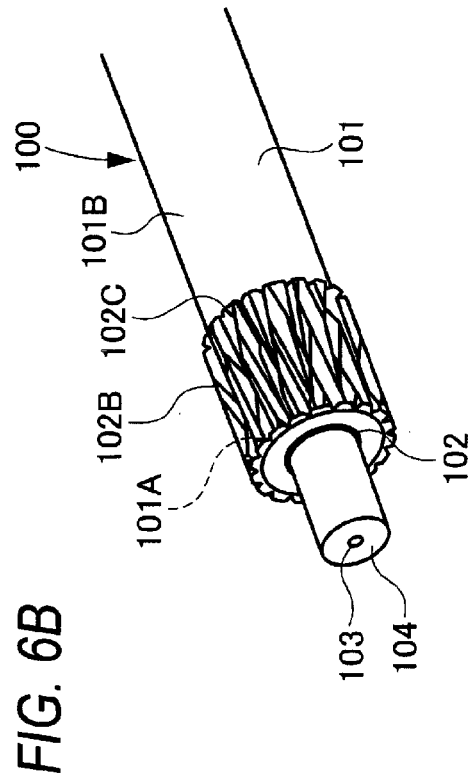

FIG. 1 is a view showing a terminal processing structure of a coaxial cable of an embodiment and is a perspective view showing a state before crimping of a shield terminal, and FIG. 2 is a perspective view showing a state after crimping of the same shield terminal, and FIGS. 3A to 3C are a step explanatory diagram of a terminal processing method of the coaxial cable.

A terminal processing structure 10 of this coaxial cable includes a coaxial cable 20, a shield terminal 30, a central conductor 40, and a dielectric 33 interposed between the shield terminal 30 and the central conductor 40.

The coaxial cable 20 includes a core wire 21, an insulator 22 with which an outer periphery of the core wire 21 is covered, a braid 23 with which an outer periphery of the insulator 22 is covered, and an outer sheath 24 with which an outer periphery of the braid 23 is covered, and the core wire 21, the insulator 22, the braid 23 and the outer sheath 24 are arranged sequentially from the center toward the outside. Also, in a distal end of the coaxial cable 20, the pin-shaped central conductor (inner terminal) 40 is attached to the core wire 21 exposed to its distal end.

On the other hand, the shield terminal 30 includes a terminal body 31, a crimp part 32, and the dielectric 33. The terminal body 31 is formed of a conductive material in substantially a cylindrical shape. The crimp part 32 is consecutively installed in one end side (the back) of the terminal body 31, and the crimp part 32 and the terminal body 31 are integrally formed by pressing a metal thin plate having conductivity. The crimp part 32 is provided with a braid crimp part 36 crimped to an exposed part 23A of the braid formed in a distal end of the coaxial cable 20, and two outer sheath crimp parts 35, 37 which are positioned in the front and back of the braid crimp part 36 and are respectively crimped to a distal piece 24A of the outer sheath 24 and a proximal piece 24B of the outer piece 24 formed in the distal end of the coaxial cable 20. Each of the crimp parts 35 to 37 is formed in a reed shape wound in a circumferential direction of the coaxial cable 20.

Also, the outer sheath 24 in the distal end of the coaxial cable 20 is divided into two pieces of the outer sheath, namely a distal piece 24A and a proximal piece 24B by being notched along a circumferential direction. Moreover, the distal piece 24A is held in a position separate from the proximal piece 24B and thereby, the exposed part 23A of the braid to which a braid crimp part 36 (described below) of the shield terminal 30 is crimped is formed between the distal piece 24A and the proximal piece 24B and also the distal end of the braid 23 is covered with the distal piece 24A.

Such terminal processing is performed in the following procedure.

First, as shown in FIGS. 3A and 3B, a core wire exposed part in which the outer sheath 24, the braid 23 and the insulator 22 are removed to expose the core wire 21, an insulator exposed part in which the outer sheath 24 and the braid 23 are removed to expose the insulator 22, and a braid exposed part in which the outer sheath 24 is removed to expose the braid 23 are formed in the distal end of the coaxial cable 20 sequentially from the distal end side. For example, by peeling the outer sheath 24, the braid 23 and the insulator 22 by proper dimensions, the core wire 21 is exposed by a dimension S1 and the insulator 22 is exposed by a dimension S2 and the braid 23 is exposed by a dimension S3.

Next, a notch X along the circumferential direction is put in a position spaced in the proximal end side from the distal end edge of the outer sheath 24 adjacent to the exposed part of the braid 23 by a predetermined dimension S4 and thereby, the outer sheath 24 is divided into two of the distal piece 24A and the proximal piece 24B.

Then, as shown in FIGS. 3B and 3C, the distal piece 24A is slid to the cable distal end side as shown by arrow Y and is held in a position separate from the proximal piece 24B and thereby, the braid exposed part 23A with a width of a dimension S5, to which the braid crimp part 36 of the shield terminal 30 is crimped, is ensured between the distal piece 24A and the proximal piece 24B and also the distal end of the braid 23 is covered with the distal piece 24A.

Then, the braid crimp part 36 of the shield terminal 30 is crimped to the exposed part 23A of the braid formed between the distal piece 24A and the proximal piece 24B and also, the outer sheath crimp parts 35, 37 formed in both sides of the braid crimp part 36 of the shield terminal 30 are respectively crimped to the distal piece 24A and the proximal piece 24B and thereby, the terminal processing structure 10 of the coaxial cable of the embodiment is constructed.

According to this terminal processing structure 10, the distal end (cut end) of the braid 23 is covered with a part of the outer sheath 24 (the distal piece 24A), so that the distal end of the braid 23 can be prevented from fraying, and the fastening strength can be prevented from decreasing due to fraying of the braid 23. Also, the braid 23 is not overlaid on the outer sheath 24 and the braid crimp part 36 of the shield terminal 30 is crimped to the exposed part 23A of the braid ensured between the distal piece 24A and the proximal piece 24B, so that a cross-sectional size of the crimp portion of the shield terminal 30 can be decreased and occupied space can be decreased.

Also, the braid 23 is only exposed between the distal piece 24A and the proximal piece 24B, so that a configuration is simple, and time and effort of terminal processing work are not required. Further, the braid crimp part 36 of the shield terminal 30 can be directly crimped to the braid (the braid in a state of making close contact with an outer periphery of the insulator) 23 in a state of being not overlaid on the outer sheath 24, so that the braid 23 is resistant to slipping at the crimp part and a high strength of fastening to the shield terminal 30 can be maintained.

Also, the braid crimp part 36 of the shield terminal 30 is crimped to the exposed part 23A of the braid formed between the distal piece 24A and the proximal piece 24B and also, the outer sheath crimp parts 35, 37 formed in the front and back of the braid crimp part 36 of the shield terminal 30 are respectively crimped to the distal piece 24A and the proximal piece 24B, so that the strength of fastening between the coaxial cable 20 and the shield terminal 30 can be increased more.

Also, the exposed part 23A of the braid is ensured between the distal piece 24A and the proximal piece 24B by sliding a part of the outer sheath 24 (the distal piece 24A) to the distal end side, so that the distal end of the braid 23 can be protected so as not to fray in a part of the outer sheath 24 while preventing the braid 23 from loosening.

In addition, the invention is not limited to the embodiment described above, and modifications, improvements, etc. can be made properly. Moreover, as long as the invention can be achieved, the number of components, materials, shapes, dimensions, arrangement places, etc. of each of the components in the embodiment described above are arbitrary and are not limited.

INDUSTRIAL APPLICABILITY

According to the invention, it is possible to provide a terminal processing structure and a terminal processing method of a coaxial cable capable of exerting a stable fastening force in the case of connecting a terminal in a simple configuration while preventing a braid from fraying.

REFERENCE SIGNS LIST 20 coaxial cable
21 core wire
22 insulator
23 braid
23a exposed part of braid
24 outer sheath
24a distal piece of outer sheath
24b proximal piece of outer sheath
30 shield terminal
35,37 outer sheath crimp part
36 braid crimp part

What is claimed is:

1. A terminal processing structure of a coaxial cable comprising:
   a core wire;
   an insulator with which an outer periphery of the core wire is covered;
   a braid with which an outer periphery of the insulator is covered; and
   an outer sheath with which an outer periphery of the braid is covered,
   wherein the outer sheath is divided into a distal piece and a proximal piece by being notched along a circumferential direction in a cable distal end,
   wherein the distal piece is held in a position separate from the proximal piece and thereby an exposed part of the braid to which a braid crimp part of a shield terminal is crimped is formed between the distal piece and the proximal piece and also a distal end of the braid is covered with the distal piece,
   wherein a braid crimp part of the shield terminal is crimped to an exposed part of the braid formed between the distal piece and the proximal piece and outer sheath crimp parts formed on both sides of the braid crimp part of the shield terminal are respectively crimped to the distal piece and the proximal piece, and
   wherein the braid crimp part and the outer sheath crimp parts are wound in a circumferential direction of the coaxial cable.

2. A terminal processing method of a coaxial cable comprising:
   forming a core wire exposed part in which an outer sheath, a braid and an insulator are removed to expose a core wire, an insulator exposed part in which the outer sheath and the
   braid are removed to expose the insulator, and a braid exposed part in which the outer sheath is removed to expose the braid sequentially from a distal end side in a distal end of the coaxial cable comprising the core wire, the insulator with which an outer periphery of the core wire is covered, a braid with which an outer periphery of the insulator is covered, and the outer sheath with which an outer periphery of the braid is covered,
   dividing the outer sheath into a distal piece and a proximal piece by putting a notch along a circumferential direction in a position spaced in the proximal end side from a distal end edge of the outer sheath adjacent to the braid exposed part by a predetermined dimension after said step, and
   ensuring an exposed part of the braid to which a braid crimp part of a shield terminal is crimped between the distal piece and the proximal piece and also covering a distal end of the braid with the distal piece by sliding the distal piece to a cable distal end side and
   holding the distal piece in a position separate from the proximal piece after said step,
   wherein a braid crimp part of the shield terminal is crimped to an exposed part of the braid formed between the distal piece and the proximal piece and outer sheath crimp parts formed on both sides of the braid crimp part of the shield terminal respectively crimped to the distal piece and the proximal piece, and
   wherein the braid crimp part and the outer sheath crimp parts are wound in a circumferential direction of the coaxial cable.

* * * * *